United States Patent
Bermundo et al.

(10) Patent No.: US 10,171,699 B2
(45) Date of Patent: Jan. 1, 2019

(54) SCANNER FOR SCANNING MICRO-DETAILS OF SPECIMENS

(71) Applicant: KYOCERA Document Solutions Inc., Osaka (JP)

(72) Inventors: Neil-Paul Bermundo, Glendora, CA (US); Tomohiro Kuwahara, Torrance, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 3 days.

(21) Appl. No.: 15/372,028

(22) Filed: Dec. 7, 2016

(65) Prior Publication Data

US 2018/0160004 A1 Jun. 7, 2018

(51) Int. Cl.
*H04N 1/024* (2006.01)
*H04N 1/00* (2006.01)
*H04N 1/03* (2006.01)
*H04N 1/10* (2006.01)

(52) U.S. Cl.
CPC ....... *H04N 1/02409* (2013.01); *H04N 1/0044* (2013.01); *H04N 1/00827* (2013.01); *H04N 1/0306* (2013.01); *H04N 1/10* (2013.01); *H04N 2201/0081* (2013.01); *H04N 2201/0094* (2013.01)

(58) Field of Classification Search
CPC ........... H04N 1/02409; H04N 1/00827; H04N 1/0306; H04N 1/0044; H04N 1/10; H04N 2201/0081
See application file for complete search history.

(56) References Cited

U.S. PATENT DOCUMENTS

| | | | | |
|---|---|---|---|---|
| 4,385,325 A * | 5/1983 | Chen | ................. | H04N 1/00013 358/483 |
| 4,685,140 A | 8/1987 | Mount, II | | |
| 5,774,179 A * | 6/1998 | Chevrette | .......... | G02B 26/0875 348/218.1 |
| 6,307,212 B1 * | 10/2001 | Huston | .................... | G01T 1/06 250/483.1 |

(Continued)

FOREIGN PATENT DOCUMENTS

WO 2006028439 A1 3/2006

*Primary Examiner* — Ming Y Hon
(74) *Attorney, Agent, or Firm* — D'Ambrosio & Menon, PLLC; Usha Menon (57) ABSTRACT

The present disclosure relates to a micro-scanning device that comprises a surface on which specimen to be scanned is positioned, and at least one micro lens configured to enable scanning of the specimen so as to obtain micro-details of the specimen. One or more micro lenses are installed below the flatbed surface in an array of movable configuration or in a stationary configuration. The device further incorporates a front panel to live-view micro-detail image of a specimen placed on the flatbed surface and incorporates means to focus, size, and zoom/scale the micro-detail image of the specimen. The device can be either a portable/handheld device or a stationary device and incorporates scan firmware to save and store or send copy of image incorporating micro-details on an associated/coupled computing device and/or in the internal memory of the scanner for performing any of stitching, printing, saving or sharing.

20 Claims, 7 Drawing Sheets

(56) References Cited

U.S. PATENT DOCUMENTS

| | | | | |
|---|---|---|---|---|
| 6,947,571 | B1* | 9/2005 | Rhoads | G06Q 30/02 |
| | | | | 382/100 |
| 7,963,563 | B2 | 6/2011 | Spencer et al. | |
| 2002/0094119 | A1* | 7/2002 | Sahadevan | G06T 7/0012 |
| | | | | 382/132 |
| 2003/0012420 | A1* | 1/2003 | Verwoerd | G06T 7/73 |
| | | | | 382/133 |
| 2003/0016301 | A1* | 1/2003 | Aizaki | H04N 5/2352 |
| | | | | 348/345 |
| 2005/0259287 | A1* | 11/2005 | Watanabe | H04N 1/2307 |
| | | | | 358/1.12 |
| 2007/0002396 | A1* | 1/2007 | Naruse | H04N 1/00519 |
| | | | | 358/474 |
| 2007/0215685 | A1* | 9/2007 | Self | G06Q 30/06 |
| | | | | 235/375 |
| 2011/0031139 | A1* | 2/2011 | Macor | B01L 3/508 |
| | | | | 206/232 |
| 2012/0120394 | A1* | 5/2012 | Chiou | G01J 3/0208 |
| | | | | 356/302 |
| 2013/0015236 | A1* | 1/2013 | Porter | G06F 21/645 |
| | | | | 235/375 |
| 2014/0327758 | A1* | 11/2014 | Hsiung | G02B 21/368 |
| | | | | 348/79 |
| 2015/0092247 | A1* | 4/2015 | Ming | H04N 1/32144 |
| | | | | 358/3.28 |

* cited by examiner

SCANNER FOR SCANNING MICRO-DETAILS OF SPECIMENS

FIELD OF DISCLOSURE

The present disclosure relates generally to the field of scanning devices. In particular, the present disclosure pertains to scanning devices capable of scanning micro-details from specimens of varying sizes including tiny/small-sized specimens.

BACKGROUND

Existing microscopes enable capturing micro-details of small (also interchangeably referred to as micro or tiny hereinafter) specimens by placing the specimens on a slide. However, whenever such microscopes are required to scan a specimen (also interchangeably referred to as samples or articles or objects hereinafter) that is more than the size of a slide, either the microscopes are not able to scan such a specimen at all, or the specimen is ripped/divided across additional slides for scanning of each slide, making it difficult or almost impossible to scan bigger specimens.

At the same time, existing multi-functional printers (MFP) are typically used for scanning, copying, and printing of office documents, illustration magazines, among other articles/items/documents. Over a period of time, such MFP's have been positioned and used primarily for office/personal purposes only and not in certain industry segments such as scientific labs, manufacturing, mining sites, among other like environments. Furthermore, it is an accepted development that demand for printing is declining and there are being made to create new business models, applications, and services around MFP's to extend their life. Efforts are also being made to find new ways to create and add value to MFPs to make them more attractive for businesses, institutions, and customers.

There is therefore a need in the art for a scanning device (also interchangeably referred to as a scanner) that is able to scan micro-details of specimen irrespective of their size such as small/tiny specimens (as usually done by microscopes) as well as bigger articles/items (as usually done by MFPs), and at the same time provide user convenience, flexibility, and find applications across industries.

SUMMARY

Aspects of the present disclosure relate to the field of scanning devices. In particular, the present disclosure provides a scanning device that is able to scan micro-details from specimen or object of any size in any position or location such as on a singular scanning flatbed or placed anywhere.

In an aspect, the disclosed scanning device can comprise a surface on which specimen to be scanned is positioned; and at least one lens assembly (also referred to as microscan lens or simply as lens and the terms used interchangeably hereinafter) configured to enable scanning of the specimen so as to obtain micro-details of the specimen (term 'scanning to obtain micro-details' also referred to as microscanning and the two terms used interchangeably hereinafter). The surface for positioning the specimen can be a flatbed surface of a conventional MFP scanner.

In an aspect, at least one lens assembly can be positioned underneath flatbed surface of the device to capture micro-details of specimen. A user can use microscan firmware to view/microscan the specimen on a front panel. The user can use the live-view on the front panel to focus, size, and zoom/scale the magnified specimen image viewed through the microscan lens. Once the user is satisfied with the final specimen image he can either print it through a printer or save it in an external database for further processing/archival.

In an aspect, the disclosed microscan device can be either a handheld/portable device or a stationary device where the microscan functionality can be integrated into a multifunctional printer (MFP). The portable device can enable micro scanning of a specimen of any size that can be placed anywhere, whereas in case of the stationary device, a micro/macro specimen can be placed on the flatbed surface of the MFP. The flatbed area of the flatbed surface can be designated flatbed area that can be small sized area within the flatbed surface to cater to microscanning of specimens; alternatively the entire flatbed surface can cater to macroscanning of specimens.

In an aspect, the specimen can include 2D objects like leaf, fabric, soil, or liquid material; or 3D objects like rocks, crystals, insects, body parts of animals, and the like. The flatbed surface can be waterproof or water-resistant or covered with a water-resistant thin-film. This can allow microscan of liquid material including blood samples, dirty water, rain water, snow and the like.

In an aspect, the microscan lens can include an assembly of one or more lenses installed in a movable or stationary configuration. The microscan lens can have adjustability controls, through firmware, for focus, size, distance, and zoom/scale of the specimen on the live-view panel of front panel. The microscan lens can be installed below the flatbed surface.

In an aspect, the magnified specimen image can be previewed on live-view panel of a front panel that can be captured by a CCD camera. The front panel can be equipped with control buttons to adjust focus, size, and zoom/scale of the magnified specimen image viewed through the microscan lens. The user can adjust the microscan lens, through the control buttons, to obtain a final specimen image having optimized magnification and quality.

In an aspect, the magnified specimen images may get distorted due to distortions in outer focus/other image related issues. A microscan firmware built in the microscan live-view can pick those distortions and can gather, assemble and stitch together to capture a best quality, high resolution magnified specimen image.

In an aspect, microscan security can be implemented to validate/authenticate microscopically encoded data pasted/glued/attached/embedded on the specimen for security purposes. The encoded data can further include smart intelligence, viz., measurement, calculation, or validation instructions to be additionally performed by the microscan system.

Various objects, features, aspects and advantages of the inventive subject matter will become more apparent from the following detailed description of preferred embodiments, along with the accompanying drawing figures in which like numerals represent like components

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms as used herein. To the extent a term used in a claim is not defined below, it should be given the broadest definition persons in the pertinent art have given that term as reflected in printed publications and issued patents at the time of filing.

Embodiments of the present disclosure relate to the field of scanning devices. In particular, the present disclosure provides a scanning device that is able to scan micro-details (alternatively referred to as microscanning) from specimen or object of any size in any position or location such as on a singular scanning flatbed or placed anywhere.

In an aspect, the disclosed scanning device can comprise a surface (also referred to as flatbed surface) on which specimen to be scanned is positioned; and at least one lens assembly (also referred to as microscan lens or simply as lens and the terms used interchangeably hereinafter) configured to enable scanning of the specimen so as to obtain micro-details of the specimen. The surface for positioning the specimen can be a flatbed surface of a conventional MFP scanner.

In an embodiment, the at least one lens assembly/micro lens can be installed below the surface in an array of movable configuration to enable scanning of entire surface; alternatively the at least one lens assembly/micro lens can be installed in a stationary configuration. In an embodiment, the at least one lens assembly/micro lens can incorporate adjustability controls for focus, size, distance, and zoom/scale.

In an embodiment, the surface can be a flatbed surface and can incorporate a small sized flatbed area to obtain micro-details of specimens positioned within the flatbed area. In an alternate embodiment, the entire flatbed surface of the device can cater to microscanning i.e. to obtaining the micro-details of specimens positioned anywhere on the flatbed surface.

In an embodiment, the device can further incorporate a front panel to live-view micro-detail image of specimen placed on the flatbed surface. The front panel can incorporate means to focus, size, and zoom/scale the micro-detail image of the specimen live-viewed through the at least one lens assembly.

In an embodiment, the flatbed surface can be waterproof or water-resistant or covered with a water-resistant thin-film to allow obtaining the micro-details of a liquid sample by placing the liquid sample directly on the flatbed surface.

In an embodiment, the device can further incorporate a repository/database of security related codes/patterns/information/data, and wherein the device is configured to compare one or more codes/patterns/information/data retrieved as part of the micro-details of a specimen to authenticate the specimen, wherein the specimen is a document incorporating the security related codes/patterns/information/data.

In an embodiment, the device can be a portable/handheld device or a stationary device. in either case it can incorporate scan firmware to save and store or send copy of image incorporating micro-details on an associated/coupled computing device and/or in the internal memory of the scanner for performing any or more of stitching, printing, saving or sharing.

Figure 1:
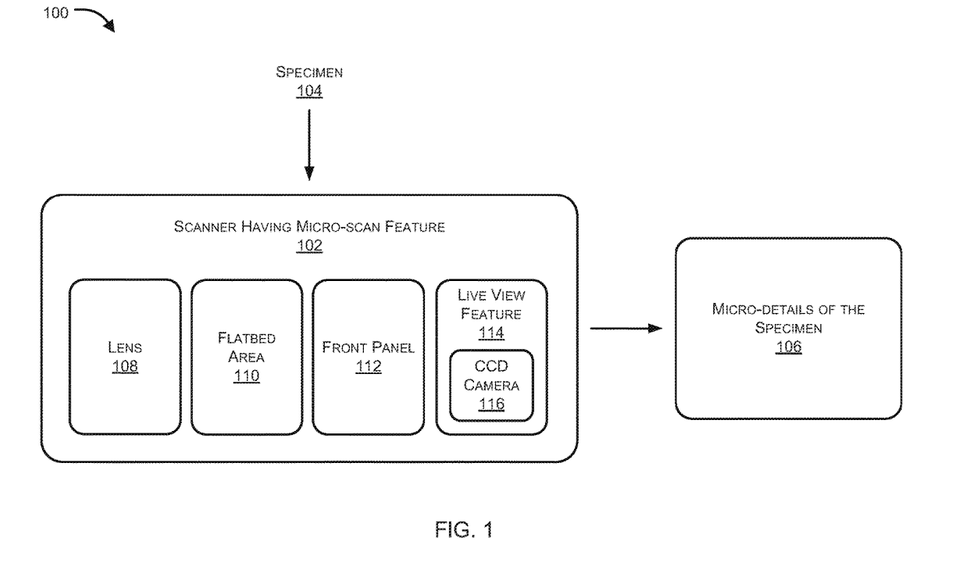
FIG. 1 illustrates an exemplary representation showing high-level view of the proposed scanning device in accordance with embodiments of the present disclosure.

FIG. 1 illustrates an exemplary representation 100 showing high-level view of the proposed scanning device 102 in accordance with an embodiment of the present disclosure. As shown, the proposed scanning device 102 can be configured to enable scanning of a specimen 104 so as to achieve micro-details 106 of the specimen 104.

In an aspect, the proposed scanning device 102 can include at least one lens assembly 108 (also referred to as micro lens 108 or micro-scan lens 108 or simply as lens 108), which can be either moveable or can be stationary during/post installation. The lens 108 can either have a singular lens configuration or a multi-lens configuration, wherein the lens 108 can have adjustability controls, say through firmware for any or a combination of focus, distance, and scaling of the specimen view.

Figure 2A:
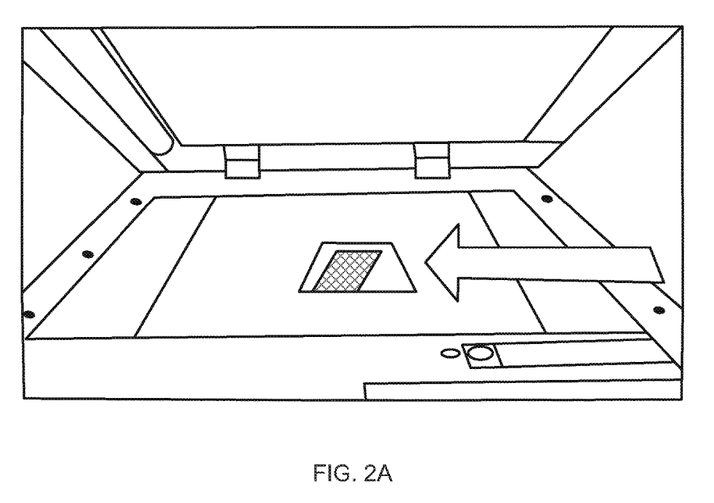
FIGS. 2A and 2B illustrate exemplary screenshots showing different versions of flatbed area in accordance with embodiments of the present disclosure.
Figure 2B:
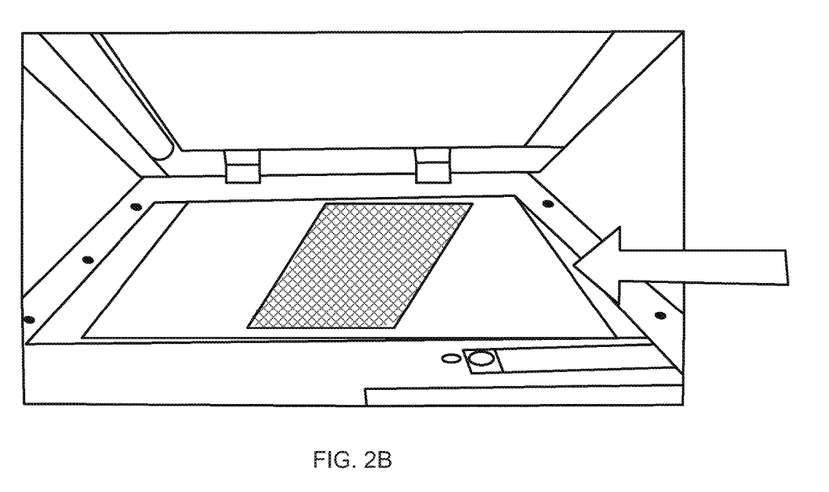

In an aspect, the proposed scanning device 102 can further include a flatbed area 110 (also referred to as microscan flatbed area) where specimen and/or object/item can be placed for scanning to obtain micro-details 106 of the specimen 104. In an exemplary embodiment, the proposed scanner flatbed surface can be similar to the stage of a microscope where microscope slides are placed. With reference to FIGS. 2A and 2B, which illustrate exemplary versions of flatbed area, it can be seen in FIG. 2A that either the flatbed area can have a designated area such as a fixed square/rectangular area on the scanner flatbed area near Charge Coupled Device (CCD) camera where relatively small specimens are placed, or as shown in FIG. 2B, the entire scanned flatbed surface is designated for use for microscan where small specimens can be placed anywhere or big objects/items such as giant leaves can be placed. In the configuration of FIG. 2A having designated area, the lens 108 can be installed underneath the scanner flatbed surface in a fixed manner and not moveable such that the lens can have a means/mechanism for adjustable focusing. Similarly, in the configuration of FIG. 2B, there may be variations on the lens configuration and installation underneath the flatbed to be able to scan any size of object on the flatbed surface. This configuration supports scanning for micro-details of any specimen, say up to the size of the entire flatbed surface. The scanning, for instance, can also be accommodated for documents/objects/articles having Tabloid or A3 size.

In an aspect, the proposed scanning device 102 can further include a panel (also interchangeably referred to as front panel) 112 that acts as an interface on which user can interact and/or control the proposed scanning device for non-limiting features such as zooming, focus, sharpness, resolution, capture, transmit, among other features. In an aspect, the panel 112 can be configured with a display to enable touch-based display and/or viewing of the specimen 104.

In another aspect, the proposed device can include a live view feature 114 that allows for real-time view of specimen 104 placed at the flatbed area 110. Such a view can, in an instance, be presented on the display of the front panel 112, or on the display of any other computing device that is associated (through wired or wireless means) or operatively coupled with the proposed scanner device 102. As the proposed lens 108 can be adjusted for focus, zoom, or scaling (or any other desired feature), change in view of the specimen 104 can immediately or simultaneously be presented/reflected.

In an aspect, the scanner firmware can be configured to update and accordingly support in scanning and previewing of specimen or item.

In an aspect, the proposed scanning device can be configured to scan micro-details of any size of specimen or object that can be accommodated in the scanning device. For instance, the device can scan and show patterns of a leaf, fabric, soil or liquid material. It can also scan any size of specimen that is not possible on existing microscope slides. The proposed device further supports scanning of visible side of 3D objects, and can also scan rocks, crystals, and other non-flat objects or specimens, along with being able to also scan insects or parts of animals or body parts (if desired).

In an aspect, the proposed scanning device can be Waterproof and can have a Water-resistant flatbed or document table 110, wherein one or more updates to the flatbed 110 can also be configured as being waterproof or water-resistant, which allows for scanning of liquid or wet specimens, such as blood droplets, dirty water, rain water, snow for ice crystal patterns and others. In an exemplary embodiment, a thin layer can alternatively be placed on top of the flatbed for water protection.

In an aspect, the proposed scanning device can include one or more knobs or controls that can be added to the display interface of the front panel 112, which allows user to adjust focus of lens 108 that is underneath the flatbed surface 110 and get a better reading of the item being scanned. Such a configuration also opens possibility for other applications that a live view of flatbed platform can offer to the scanner firmware such as allowing user to verify alignment of document page to be scanned before the user presses "Start" scan button. In an aspect, a CCD camera 116 can be configured in the scanner to support the live-view feature 114, wherein the CCD camera 116 that is also used for scanning may be adjusted to enable exposure or live view of the specimen 104 in the scanner flatbed and relay the view to the front panel 112.

In an aspect, the proposed scanning device enables capturing of high-resolution images from the proposed microlenses 108.

In an exemplary application of the proposed scanning device, documents and/or objects/specimens with microscopically encoded data pasted or glued to the documents/objects/specimens can be validated using the proposed scanning device for security purposes. For instance, one or more codes/patterns/information/data stored as part of the retrieved micro-details 106 of the specimen 104 can be compared with a repository/database to confirm if the document is authentic/correct/valid. Any other security application can also be implemented by using the retrieved micro-details 106 of the specimen 104. For instance, currently in existing solutions, Raster Image Processor (RIP) only processes at 1 pixel at the tiniest, for all resolutions supported in the device, but only scans and/or renders at 100% magnification, with support for some type of zooming or scaling. Therefore, existing solutions/devices may not handle and process micro-details. Through the integration of MicroScan Feature according to the present embodiments, micro-details can now be scanned from specimens in more detail even on devices with low resolution support. This new capability can now be possible in RIP firmware using the proposed scanning device according to the present embodiments. In addition, the proposed scanning device can surely enable security/authenticate/validation features through external tiny barcodes, text, iris or fingerprint or other patterns that can be glued or attached to documents/specimens or items that can be scanned through the proposed scanning device and can serve as security features that only the proposed scanner can verify. As larger paper size cannot be fed onto regular microscopes or other scanners, only the proposed scanning device can verify and validate these security features on the documents or other materials. In an exemplary implementation, the proposed scanning device can read micro-encoded feature(s) from one or more documents/specimens being scanned so as to verify authenticity of documents. In another exemplary implementation, firmware/scanner of the present invention can also be configured to perform measurements, calculations, and other validations on scanned micro-details, which can, in an instance, be used in conjunction with above security applications/implementations to verify validity of security features that are on the scanned materials.

Security Application of Proposed Scanning Device

As mentioned above, scanning device 102 of the present invention can scan and analyze micro-details from a specimen, such micro-details being integrated with specimens such as documents that can be printed as well. Therefore, a printed document can be scanned and micro-details can be retrieved/extracted therefrom to allow analysis, comparison, and validation of the extracted micro-details.

In an aspect, micro-details can be digitally integrated on a printed paper, wherein security codes for authenticity, privacy or other purposes can be generated and scaled down at an originating device into micro-detail representation that can then be rendered onto printed document on paper for later validation and verification at the receiving device or entity. In an implementation therefore micro-detail digital creation can be initiated at an originating device, wherein a code can first be generated from specimens or through calculations and algorithms, and the code is encoded into a micro-detail representation such as barcode, raster image, QR code, or other patterns, including in the form of specimens such as micro-details from a leaf, ice crystals, and others. Digital representation of the micro-detail can then be created, wherein such digital representation can be rendered in a defined location on the logical document to be printed. The digital representation can be printed onto paper, said paper having the digitally rendered micro-detail.

At the receiving device, document to be processed can be received, wherein the receiving device can be any of a fax machine, a printer, an MFP or any other imaging device having aspects of the present invention such that the receiving device detects presence of encoded micro-detail and MicroScan feature of the receiving device scans the micro-detail so as to process, decode, validate and verify the micro-detail code for security purposes or authentication purposes. Receiving device can then perform one or more configured actions based on the scanned micro-detail.

In an aspect, when there are multiple high resolutions are available in printer, MicroScan Feature of the present disclosure can allow for the user to choose a resolution to render micro-detail with. On the other hand, when lower resolutions such as 600 dpi are available instead of higher resolution of 1200 dpi, a warning message can be indicated to the user that micro-detail may not be rendered at best quality. In an aspect, when rendering quality at lower resolutions are acceptable to user, or when MicroScan Feature firmware determines that micro-detail can be rendered at acceptable, if not best quality, even at such lower resolutions, the warning message need not be shown. In an aspect, MicroScan Feature firmware or system can allow for choosing or selection of higher rendering resolutions, whenever such technologies and features are available.

In an alternate embodiment, specimens such as leaf with pattern, leather, fabric, glued powder or dust can be integrated, attached, pasted, stapled, affixed or added in some physical way (all of these methods now referred to as "attached" going forward) onto documents, paper or even such objects or other specimens that can be scanned. Such attached specimens can serve as input micro-details into MicroScan Feature. The MicroScan Feature can then perform analysis to check for validity, authenticity, security and other checking or matching processes on the document, object or specimen with the attached micro-detail. With this capability, it is possible to develop applications or workflows for such documents, objects or specimens that included such security feature through attached micro-details. There are two types of physically-attached specimens: a digitally-rendered micro-detail onto a media but physically attached to a separate document or another specimen, or an actual specimen that is not digitally rendered, and physically attached to a document or another specimen. For the purposes of this disclosure, documents, objects or specimens with attached micro-detail can be grouped together in the term "Secured Item". In an exemplary implementation, workflow for handling of Secured Items can include the step of user selecting or defining micro-detail to use for an item (document, object, other specimen), and attaching fragment of a specimen, or a cut-out of a printed digitally-rendered micro-detail to the item to make it into a "Secured Item". In an aspect, user can use different and varying microscopic patterns each time, making each scanned, printed or transmitted documents unique. User or MicroScan Feature system of the present disclosure can then register the Secured Item, wherein the micro-detail is registered and saved for future validation and verification. In an aspect, micro-detail can be saved at a centralized location, server, cloud storage or cloud service, wherein the user can distribute the "Secured Item" as an original document, object or specimen. Due to unique properties of the micro-detail attached to the document, that is potentially non-reproducible, even by re-printing the document due to its microscopic detail, and therefore the Secured Item remains a unique document, object or specimen. The micro-detail can be configured to make the document unique, like how fingerprint is unique to individuals. Wherever the physical printout, document, object or specimen goes, it is possible to validate and verify its security and authenticity through the proposed MicroScan Feature such that when document, object, or specimen is processed through the proposed MicroScan Feature, the MicroScan Feature System can extract, decode, process, translate and interpret the attached micro-detail.

In an aspect, through coordination between encoding and/or encryption at originating or sending device, and in decoding and/or decryption of security micro-details at destination or receiving device, it would be possible to perform validation and verification of the micro-details used for securing the documents. Basic validation method can be performed through offline or out-of-the-device coordination of sending/originating entity (human) and receiving/destination entity (human) to agree on what the micro-detail contains, and how to encode/decode, and encrypt/decrypt the micro-detail for security purposes. It is possible to do automated encoding/decoding and/or encryption/decryption at sending/originating and receiving/destination imaging devices with MicroScan Feature support. Such can be accomplished through the use of programmatic algorithms to perform encoding/decoding and/or encryption/decryption, and transmission of encoding/decoding and/or encryption/decryption keys so that end-to-end validation, verification, comparison and other calculations can be done through MicroScan Feature to guarantee authenticity, validity and other criteria that needs to be checked on the document with the micro-detail.

The present disclosure therefore supports both manual or offline coordination, and automated, dynamic methods for performing validation, verification and checking to guarantee authenticity, validity and other criteria that needs to be satisfied. In an aspect, whether the micro-detail is digitally rendered, or physically-attached to document, object or specimen, the MicroScan Feature supported in imaging devices or other devices, may perform one or more actions in order to facilitate and enforce rules required in the workflow defined for the use of Micro-Detail for security purposes. One such action involves sending out alerts for invalid, unauthorized, insecure or fake documents. Another action can include sending notification to proper authorities when secret messages are decoded. Yet another action can include requirement of user or login authentication (which may be integrated with the proposed imaging devices) in order to read or view the decoded secret message. Interested parties may be required to provide security credentials (ID, login, password, and the like) before they can view the decoded messages.

In an aspect, when the secured item is being printed and found to be fake, unsecure or in other invalid state, imaging device can overlay watermarks or other imaging effects so that the printed document is not exact reproduction of the original. It will also give a hint to receiving entity or receiving humans that the document has been tampered with. Imaging device with proposed MicroScan Feature support can also prevent printing, storage, transmission or further processing of an invalid document.

In an aspect, an application of micro-details attached in documents can be referred to as inclusion of an encoded message. Currently, secret messages can be added in documents through use of images in a puzzle like arrangements that recipients must then decode to get the original message, which relies heavily on decoding skills of recipients, who are, most of probably, humans. Use of micro-details digitally rendered onto scanned, transmitted or printed documents will be a new way of including encoded and/or encrypted messages that would require MicroScan Feature to decode, validate, translate and display.

As discussed above, users may also come up with specimens with micro-details that user can arrange in some way so as to encode a message. When such user-defined micro-details or sets of micro-details are physically attached onto scanned, printed documents, or other specimens, the MicroScan Feature can then process and extract those micro-details for decoding.

Specimens with micro-details, or specimens with digitally-rendered micro-details and physically attached onto scanned or transmitted or printed documents are two types of specimens that can also be used for encoding messages. Such physically attached micro-details may contain encoded and/or encrypted messages that the MicroScan Feature can understand, process and decode. In all cases, the encoding and decoding process would be an algorithm and a method and including rules and policies that are enforced between sending and receiving entities. Such algorithms, methods and systems would be handled, managed and performed in both sending and receiving computers or imaging devices.

In an aspect, secret messages or codes can be encoded through user-defined rules, and rendered digitally or arranged physically onto scanned or printed documents. The message to be encoded may be arbitrary and may depend on purpose of the user. Any encoding and encrypting algorithm can be used. The encoded and encrypted messages or codes can then be converted into micro-details digitally and rendered digitally onto printed documents, onto physical paper. The rendered format may be through micro-details of barcodes, QR code, raster image, patterns including leaf, ice crystals, fractals or other specimen patterns that can be used to depict the message.

At the receiving entity, which would be an imaging device with the proposed MicroScan Feature, micro-details in the scanned or printed document would be processed, extracted, decoded and/or decrypted. Decoding and decryption rules and policies would be coordinated with the user or institution for proper validation, translation and correct interpretation. The overall workflow or processes would be to use the MicroScan Feature to digitally render micro-details onto printed and/or transmitted documents, and to use MicroScan Feature to extract, decode and decrypt the micro-details.

In an aspect, the proposed scanning device 102 can allow for capability to directly scan any object/specimen 104, and be able to print new micro-details 106 of the scanned object. In an exemplary environment, such objects/specimens can include features from industries/academia relating to chemistry, biology and other scientific labs, learning institutions, manufacturing, or even mining industries. Obtaining such micro-details 106 from the proposed scanning device 102 can enable assessment of new patterns, new colors, and even set of images, all captured through the lens 108 of the proposed invention.

As mentioned above, the proposed scanning device 102 can enable scanning of any size of specimen, for instance, not just tiny piece of a leaf but even an entire giant leaf, up to the size of the flatbed scanner. As few flatbeds are of Tabloid or A3 size, more/further micro-details can be obtained by scanning of the objects. Using the proposed device therefore, complete micro-patterns from big specimens or objects can be studied. Anything that the flatbed 110 of the proposed scanner can accommodate can be scanned, which would otherwise be impossible to do on a microscope where one can only fit a tiny piece on the microscope slide.

As also mentioned above, the proposed scanning device can be configured to obtain micro-details from scanning of documents with microscopically rendered patterns or externally attached security features that can add new usage for MFPs with the proposed microscan feature which can be an exemplary way to verify authenticity or validity of printed documents for security purposes. One exemplary application of this feature can be in forensics where parchments or some piece of evidence can be micro-scanned for fingerprints or other DNA samples.

In another exemplary implementation, aspects of the present disclosure can allow scanning of a true specimen/pattern through a microscope, which pattern can then be used by a user to integrate into his/her document, and wherein the proposed device can scan a second specimen to obtain micro-details of the specimen and then compare the obtained micro-details with the pattern of the true specimen to confirm if the second specimen is authentic/verified. In an aspect, microscopic pattern can also be added to scanned or stored print jobs, which can be verified for authenticity on the other end by programmatically checking the included microscopic pattern.

In another exemplary embodiment, user of the proposed device can use different and varying microscopic patterns each time, giving each scanned and printed document, unique characteristics and/or properties. Such microscopic patterns can become additional security code that can be included in scanned and printed documents. Microscopic patterns in scanned or printed documents can also be verified for authenticity through the proposed scanning device upon receipt of such scanned, printed or transmitted documents. In an exemplary and a non-limiting manner, based on sender and user offline coordination, such security enabling microscopic patterns can offer an extra level of security. In an aspect, for transmitted or soft-copy scanned or printed jobs, security patterns can be encoded and compressed to prevent duplication, which can be an additional security feature for scanned, printed or transmitted documents. Any other way to perform authentication and/or validation such as through automated, programmatic, or handshake mechanism is well within the scope of the present disclosure.

As the proposed device avoids requirement of a microscope, strain caused to the eye of a user doing his/her counting through the tiny eyepiece on the microscope can be eliminated as the micro-details obtained from the proposed scanning device can also be printed up to, for instance, A3 paper size or any other dimension/size as may be desired (based on which construction of the scanning device can be changed). In an aspect, using the proposed device, activities of the users can be performed offline, say by looking at an actual printout or in a big-screen TV in live-view.

In another aspect, software update to firmware of the proposed scanner can support auto-identification of certain elements in the scanned specimen. For instance, the proposed scanner can be enabled to perform blood counting or identification of certain bacteria during or after the specimen scanning, which can ease work in laboratories or learning institutions.

In an aspect, the proposed scanning device can further be used to render tiny fonts, images, patterns or any encoded data onto printed pages, wherein the device can be used to scan microscopic details for verifying authenticity or for other security purposes. Micro-details obtained/analyzed/retrieved from the scanned specimen can be matched with known patterns (or with scanned images/details obtained from microscopes) to confirm the quality, authenticity, among other qualitative and/or quantitative parameters of the specimen in context.

Handheld/Portable Scanning Device Embodiment

In an exemplary embodiment, the proposed scanning device can be configured as a handheld/portable scanning device that can be taken to any desired location to scan a specimen and obtain micro-details thereof. In an aspect, the proposed handheld scanner can be a detachable device for capturing hard-to-reach objects or specimens, things that are standing or attached to walls such as paintings, tree barks, leaves, animals, statues, to name a few. The proposed handheld scanner can have at least one or a combination of microscope lenses, with or without internal storage, and capable of scanning one or more images at a time. In an aspect, the handheld scanner can be operatively coupled with another computing device such as a main MFP device or a display device such as a television/laptop/mobile phone through wireless or wired means. In such a scenario, patterns and/or images captured by the proposed handheld scanner can also be stored on the associated/coupled computing device and/or in the internal memory of the handheld scanner for performing any or more of stitching, printing, saving or sharing.

In an exemplary aspect, the proposed handheld scanner can be configured as a stand-alone scanning device or can be configured with network/device connectivity features such as Internet, Bluetooth, Zigbee, and Near-Field Communication (NFC) to name a few. In another aspect, proposed handheld scanner that if connected to a main scanning device (say a MFP having microscan capability) can also allow larger specimens or objects, even of objects that are standing, or attached to walls, or in inaccessible places. As mentioned above, the proposed handheld device can include one or more lenses and CCD configured to capture micro-details of specimens. In another aspect, the portable scanning device can support various ports and connectivity features including but not limited to HDMI and display ports, USB, WiFi, Bluetooth, NFC and others, which allows for connecting the device to MFPs, personal computers, tablets, TV or other computing devices.

Figure 3A:
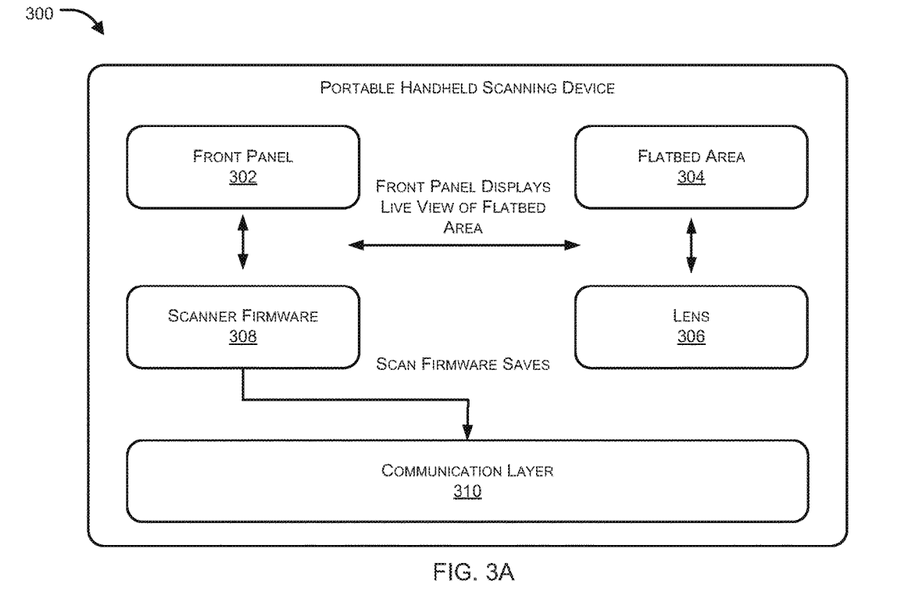
FIGS. 3A and 3B illustrate exemplary block diagrams of portable handheld microscanner and MFP based microscanner respectively in accordance with an embodiment of the present disclosure.

With reference to FIG. 3A, the proposed handheld scanner 300 can include a front panel 302 having an interface on which a user can control the handheld scanner 300 such as control any or a combination of scanning quality, resolution, time, type, speed, among other attributes along with being able to interact with the handheld scanner 300 to perform image processing such as focus adjustments. The front panel 302 can further enable live-view display of the specimen that is placed on the flatbed surface/area 304 of the handheld scanner 300. In an aspect, the front panel 302 can further include a plurality of control knobs for performing adjustments for focus, size, scaling, among other features such as configuration settings and settings to select destination of scanned image. In an aspect, the flatbed surface/area 304 can be a physical glass surface on which a specimen is placed, wherein thickness, clarity, and water resistance can be included in design and choice of material for best image capture quality. Any construction or configuration of the flatbed surface/area 304 is completely within the scope of the present invention. In another aspect, the handheld scanner 300 can include one or more lens 306 that can be configured/chosen based on desired magnification capabilities. The handheld scanner 300 can further include a firmware 308 that can be configured to support image capture, adjustments, and live view capabilities. In another aspect, the proposed handheld scanning device 300 can include or be operatively coupled with a Communication Layer 310 that is underlying the firmware 308 and supports transfer of captured image from the firmware 308 to outside of the portable scanning device. The portable scanning device can support various connectivity means including but not limited to HDMI, USB, Bluetooth, WiFi and others, wherein the communication layer 310 can transfer or download images it captures and send it through these communication layer.

MFP Based Scanning Device Embodiment

Figure 3B:
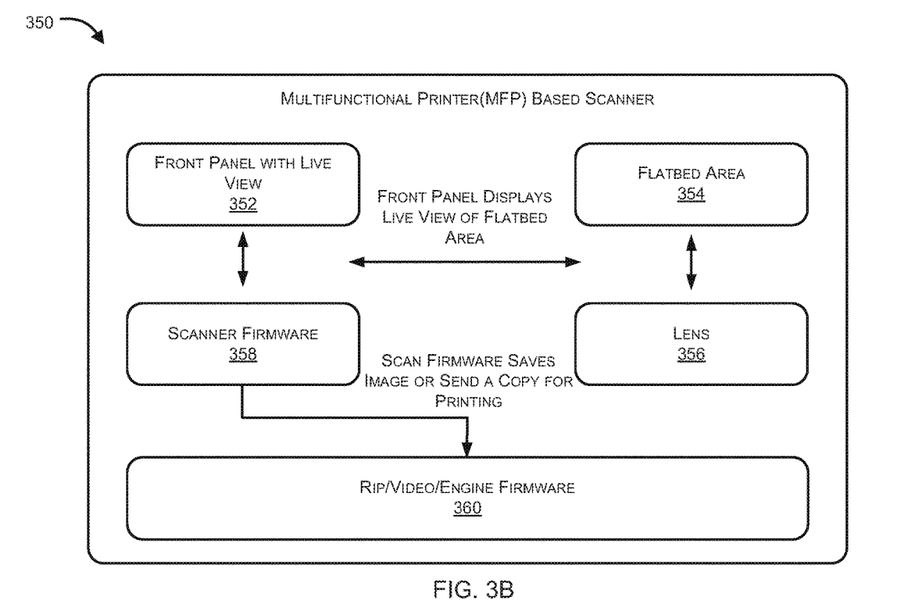

In an embodiment, the proposed scanning device can be configured in a Multi-Functional Printer (MFP) such that the scanning device can enable retrieval of micro-details from the specimen being scanned. With reference to FIG. 3B, the MFP device 350 can include a front panel 352 that supports live-view along with providing other features mentioned above and features supported by existing MFPs, a flatbed area 354, a lens mechanism 356, and a firmware 358, wherein the firmware 358 supports any or a combination of focus and scaling adjustments, actual scanning support, and printing and job storage support. Functions of the above components may be similar to the corresponding ones described for handheld scanner 300. Furthermore, as can be seen, MFP device 350 can further include a RIP/Video/Engine Firmware 360 that can support receipt of captured image(s) from the firmware 358 and process through raster image processing (RIP) for printing or job storage, or for transmission to via e-mail.

Figure 4A:
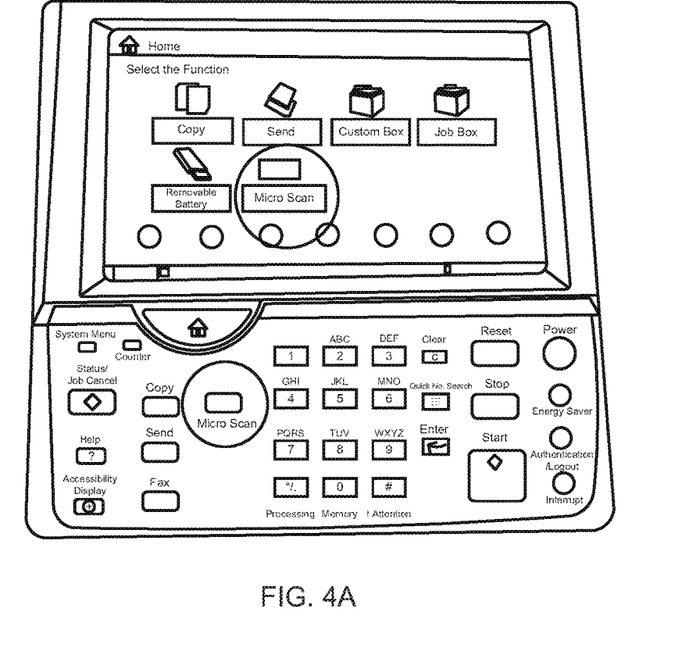
FIGS. 4A and 4B illustrate exemplary screenshots showing front panel of the proposed scanning device and live-view of a specimen being scanned along with control means/options respectively in accordance with an embodiment of the present disclosure.
Figure 4B:
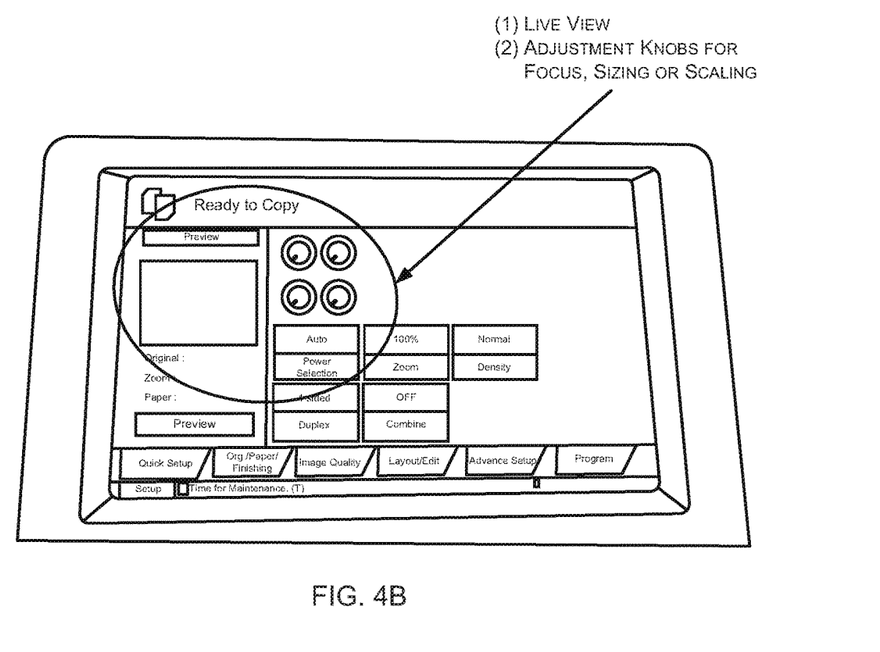

FIG. 4A illustrates an exemplary screenshot showing front panel of the proposed scanning device in accordance with an embodiment of the present disclosure, wherein the front panel can include multiple interface options (touch based or knob/button based) that can enable control of the quality of scan, manner of scan, and type of scan. FIG. 4B illustrates another exemplary screenshot showing live-view of a specimen being scanned along with control means/options that can enable control/menu of how and the manner in which scanning of the specimen is conducted. In an exemplary embodiment, such control can be performed by means of a knob-like control that is configured on the front panel of the scanning device so as to enable adjustment of the specimen, adjustment of focus of the specimen, adjustment of size of the specimen, adjustment of lighting of the specimen, adjustment of scaling, among other control options.

Figure 5A:
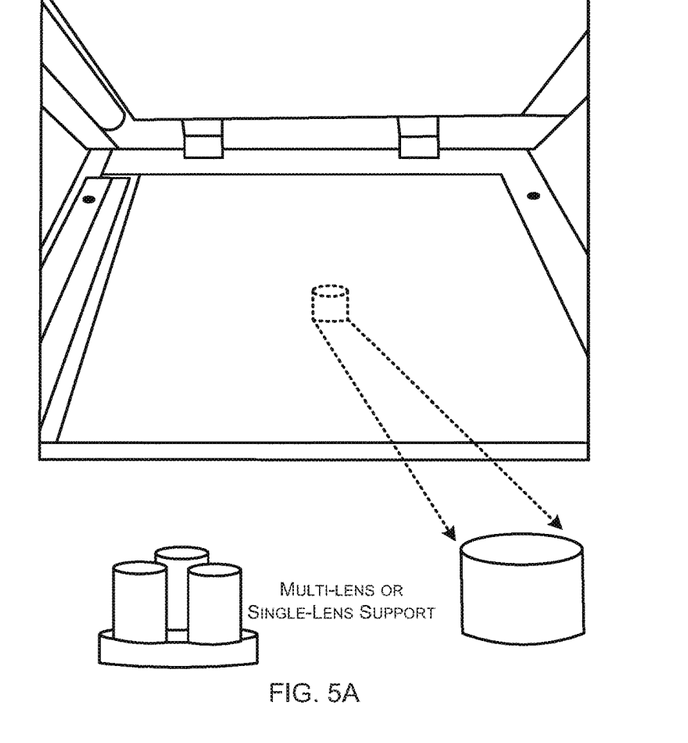
FIG. 5A illustrates an exemplary screenshot indicating placement of lens in the proposed scanning device/scanner having a flatbed surface in accordance with an embodiment of the present disclosure.

FIG. 5A illustrates an exemplary screenshot indicating placement of lens in the proposed scanning device/scanner having a flatbed surface. In an aspect, as can be seen, lens can either be a single lens or can be a combination of lens. Furthermore, the lens assembly can be a movable lens assembly for focus, distance, or scaling adjustments, and therefore enables re-focus of the lens so that the captured image is clear and good quality. In an aspect, there can be varying magnification powers for each lens component, wherein a current lighting component may be used to assist in capturing the micro-details or a separate bulb can be installed on the flatbed cover for when the cover is closed. All the above implementations are completely exemplary in nature and any other construction, configuration, or implementation can be incorporated, all of which possible variations are well within the scope of the present invention.

Figure 5B:
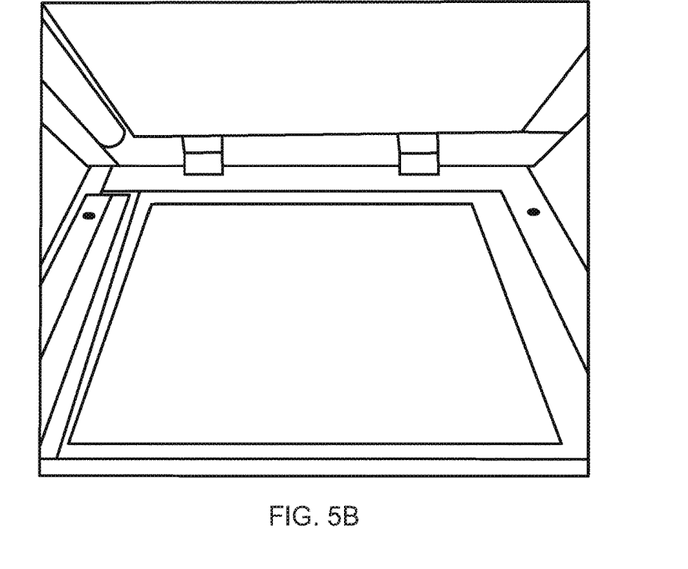
FIG. 5B illustrates an exemplary screenshot showing an assembly that includes entire scanner flatbed surface configured for implementing the microscan feature in accordance with an embodiment of the present disclosure.

FIG. 5B illustrates an exemplary representation showing an assembly that includes full or entire scanner flatbed surface configured for implementing the proposed microscan feature to obtain micro-details from a specimen.

Figure 6A:
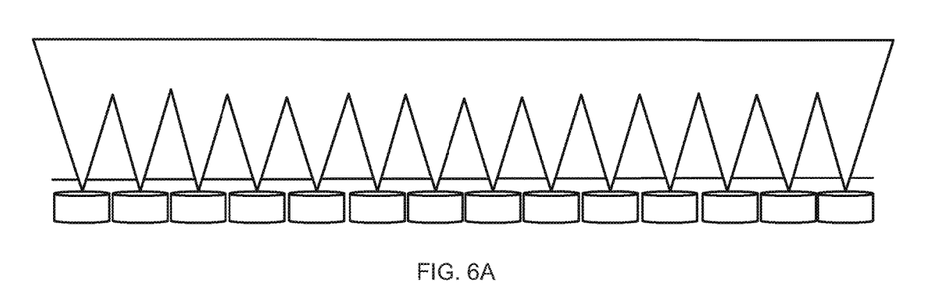
FIG. 6A illustrates an exemplary arrangement of multiple lens configuration in accordance with an embodiment of the present disclosure.

FIG. 6A illustrates an exemplary lens configuration of the proposed scanning device in accordance with an embodiment of the present disclosure, wherein the representation shows an array of micro-lenses that can be configured to capture micro-details from a specimen on flatbed of the scanner. In an aspect, on such a multi-lens configuration, a line of micro-lenses can be installed on either a fixed location underneath the flatbed surface or can be installed on a moveable bar that can be moved along the length of the flatbed surface to be able to capture micro-details from the specimen or object. In an aspect, on fixed location, a moveable mirror and light mechanism can help focus the reflected image through the lenses before they are captured into the CCD camera. In an aspect, there can be an overlap in the viewing area of the lenses, which the firmware of the proposed scanning device can determine, and remove the distortions among other imaging issues so as to aim at capturing one quality image from the flatbed surface. In an aspect, the scanned image can stitch together the images captured from each lens to assemble a complete, un-distorted, ultra-high resolution of the specimen image.

Figure 6B:
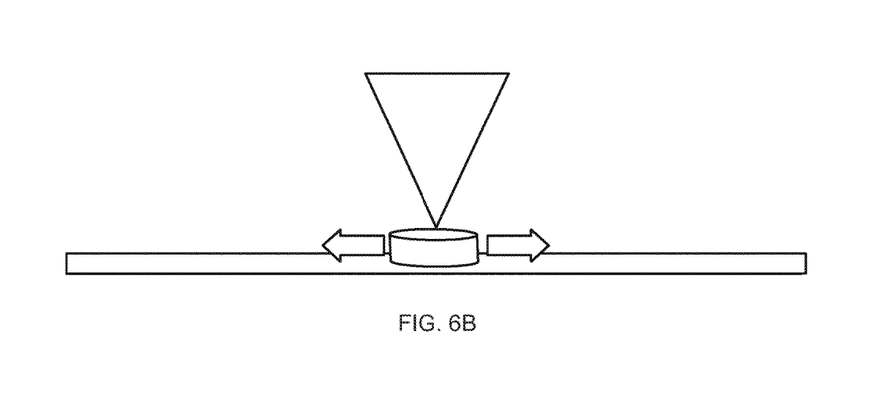
FIG. 6B illustrates a single movable lens configuration in accordance with an embodiment of the present disclosure.

FIG. 6B illustrates a single lens configuration where the lens itself can be moved laterally to be able to capture a line of micro-detail to be reflected or transmitted to the CCD camera. In an aspect, on the circular area that the lens sees, there may be distortion on the image, which the proposed firmware can determine along with handling other imaging issue, and accordingly gather, assemble and stitch together for the best quality, high resolution captured image.

Figure 7:
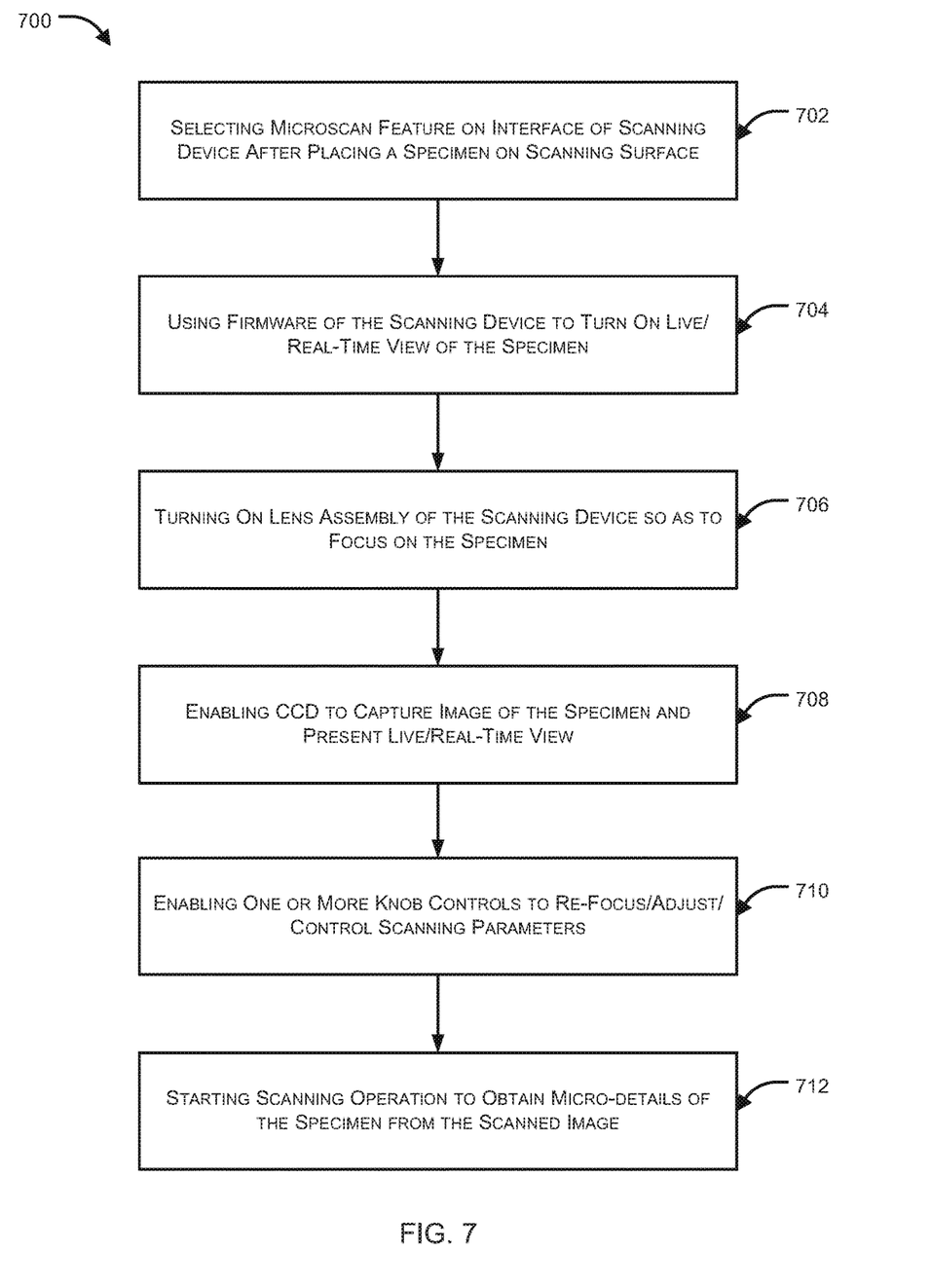
FIG. 7 illustrates an exemplary flow diagram showing implementation of the proposed scanning device in accordance with an embodiment of the present disclosure.

FIG. 7 illustrates an exemplary flow diagram 700 showing an exemplary implementation of the proposed scanning device in accordance with an embodiment of the present disclosure. As shown, at step 702, microscan feature can be selected by a user on the interface of the proposed scanning device after a specimen is placed on the scanning surface of the device, based on which, at step 704, firmware of the scanning device can turn on live/real-time view of the specimen. At step 706, lens assembly of the scanning device can be turned on so as to focus on the specimen, whereas at step 708, the CCD captures image of the specimen and presents the live/real-time view. At step 710, one or more knob controls configured on the front panel/interface of the scanning device can be used to re-focus/adjust/control scanning parameters including adjustment of live-view and lens operational parameters. At step 712, scanning operation can be started to obtain micro-details of the specimen from the scanned image.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A scanning device with a surface for placing documents to be scanned, said device comprising at least one microscan lens assembly for facilitating micro-scanning functionality; said at least one microscan lens assembly configured to enable micro-scanning of a specimen so as to obtain micro-details present in the specimen, wherein the at least one microscan lens assembly incorporates adjustability controls for any or a combination of focus, size, distance, zoom, and scale; and a front panel to live-view the obtained micro-details present in the specimen; wherein the surface includes a designated area near the at least one microscan lens assembly for positioning of the specimen; and wherein the device further incorporates capability to stitch plurality of images containing the micro-details obtained from a single or more than one of the at least one microscan lens assembly.

2. The device of claim 1, wherein the at least one microscan lens assembly is installed below the surface in any of a movable configuration or a stationary configuration.

3. The device of claim 1, wherein the surface is a flatbed surface.

4. The device of claim 3, wherein at least a part of the flatbed surface is configured to obtain the micro-details present in the specimen.

5. The device of claim 1, wherein the front panel incorporates means to perform any or a combination of focus, size, adjust, zoom, and scale the obtained micro-details live viewed through the at least one microscan lens assembly.

6. The device of claim 1, wherein the surface is waterproof or water-resistant or covered with a water-resistant thin-film to allow obtaining the micro-details of a liquid specimen.

7. The device of claim 1, wherein the device is configured for printing, saving or sharing the micro-details.

8. The device of claim 1, wherein the device is configured as a multi-functional printer (MFP) to enable retrieval of the micro-details present in the specimen.

9. The device of claim 1, wherein at least a part of the micro-details of the specimen is evaluated to confirm any or a combination of authenticity of the specimen, a qualitative parameter of the specimen, a quantitative parameter of the specimen, and a security parameter of the specimen.

10. The device of claim 1, wherein the device automatically computes one or more quantitative or quantitative parameters of the scanned specimen based on the micro details obtained during the scanning operation.

11. The device of claim 1, wherein the obtained micro-details are analyzed, compared, and validated to authenticate and/or validate the specimen.

12. The device of claim 1, wherein the specimen either inherently comprises the micro-details, or the micro-details are explicitly embedded into the specimen.

13. The device of claim 12, wherein the micro-details, when explicitly embedded into the specimen, represent encoded digital information of a defined code, wherein the encoded information is in the form of any or a combination of barcode, raster image, QR image, or a defined pattern, such that when scanned by the device, the encoded digital information is decoded to validate and/or verify the specimen.

14. A scanning device with a surface for placing documents to be scanned, said device comprising at least one microscan lens assembly for facilitating micro-scanning functionality, said at least one microscan lens assembly configured to enable scanning of a specimen so as to obtain micro-details present in the specimen, wherein the obtained micro-details are analyzed, compared, or validated to authenticate or validate the specimen; wherein the surface includes a designated area near the at least one microscan lens assembly for positioning of the specimen; and wherein the device further incorporates capability to stitch plurality of images containing the micro-details obtained from a single or more than one of the at least one microscan lens assembly.

15. The device of claim 14, wherein the specimen either inherently comprises the micro-details, or the micro-details are explicitly embedded into the specimen.

16. The device of claim 15, wherein the micro-details, when explicitly embedded into the specimen, represent encoded digital information of a defined code, wherein the encoded information is in the form of any or a combination of barcode, raster image, QR image, or a defined pattern, such that when scanned by the device, the encoded digital information is decoded to validate and/or verify the specimen.

17. The device of claim 14, wherein a code is encoded and/or encrypted through at least one rule and rendered digitally or arranged physically onto the specimen in the form of the micro-details such that when the specimen is scanned by the device, the obtained micro-details are processed, extracted, decoded and/or decrypted to verify and/or authenticate the specimen.

18. A method of obtaining micro-details of a specimen, said method comprising the steps of:

enabling microscan feature of a scanning device with a surface for placing documents to be scanned, said scanning device comprising a camera, and at least one microscan lens assembly;

using firmware of the scanning device to turn-on live view of the specimen;

turning on the at least one microscan lens assembly;

placing the specimen on the surface, wherein the surface includes a designated area, near the at least one microscan lens assembly, for positioning of the specimen;

enabling the camera to capture image of the specimen;

starting the scanning feature of the scanning device to obtain the micro-details of the specimen from the captured image; and stitching plurality of images containing the micro-details obtained from a single or more than one of the at least one microscan lens assembly.

19. The method of claim 18, wherein the scanning device comprises a front panel that incorporates means to perform any or a combination of focus, size, adjust, zoom, and scale the obtained micro-details live-viewed through the at least one microscan lens assembly.

20. The method of claim 18, wherein the at least one microscan lens assembly incorporates adjustability controls for any or a combination of focus, size, distance, zoom, and scale.

* * * * *